(12) United States Patent
Engelhardt et al.

(10) Patent No.: US 11,398,793 B2
(45) Date of Patent: Jul. 26, 2022

(54) METHOD FOR CONTROLLING DISSIPATED HEAT IN AN ELECTRICAL POWER PLANT OF A MOTOR VEHICLE, ELECTRICAL POWER PLANT FOR A MOTOR VEHICLE, AND MOTOR VEHICLE

(71) Applicant: Bayerische Motoren Werke Aktiengesellschaft, Munich (DE)

(72) Inventors: Daniel Engelhardt, Munich (DE); Jovan Knezevic, Munich (DE); Hajo Meinert, Munich (DE); Thomas Prosser, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 321 days.

(21) Appl. No.: 16/837,668

(22) Filed: Apr. 1, 2020

(65) Prior Publication Data
US 2020/0228048 A1 Jul. 16, 2020

Related U.S. Application Data

(63) Continuation of application No. PCT/EP2018/081356, filed on Nov. 15, 2018.

(30) Foreign Application Priority Data

Dec. 14, 2017 (DE) ..................... 10 2017 222 684.6

(51) Int. Cl.
*H02P 29/66* (2016.01)
*B60L 1/00* (2006.01)
(Continued)

(52) U.S. Cl.
CPC ............ *H02P 29/666* (2016.11); *B60L 1/003* (2013.01); *B60L 1/02* (2013.01); *B60L 15/20* (2013.01); *B60L 2240/425* (2013.01)

(58) Field of Classification Search
CPC .. B60L 1/02; B60L 15/20; B60L 1/003; B60L 2240/425; H02P 29/62; H02P 21/00; H02P 29/666; Y02T 10/72
See application file for complete search history.

(56) References Cited

U.S. PATENT DOCUMENTS

2015/0016170 A1\* 1/2015 Olarescu ............... H02M 7/537
  363/132
2017/0036546 A1  2/2017 Schedel et al.
(Continued)

FOREIGN PATENT DOCUMENTS

DE   10 2011 004 384 A1   8/2012
DE   10 2012 019 005 A1   4/2013
(Continued)

OTHER PUBLICATIONS

International Search Report (PCT/ISA/210) issued in PCT Application No. PCT/EP2018/081356 dated Feb. 12, 2019 with English translation (five (5) pages).
(Continued)

*Primary Examiner* — Jared Fureman
*Assistant Examiner* — Duc M Pham
(74) *Attorney, Agent, or Firm* — Crowell & Moring LLP

(57) ABSTRACT

An electric traction machine, a motor vehicle, and a method for controlling dissipated heat in the electrical power plant of the motor vehicle are described herein. The power plant is supplied with a current, where, in order to provide a predetermined amount of dissipated heat, a ratio between a field-forming and a torque-forming current deviating from an optimum ratio for a respective operating point of the power plant is prescribed. The predetermined dissipated heat is provided by a power plant embodied as a magnet-less three-phase alternator while a rotor current flowing through a rotor of the three-phase alternator is adjusted, the field-forming and the torque-forming currents being prescribed (Continued)

such that acoustic interference signals of the three-phase alternator are minimized by the ratio, and the rotor current is adjusted such that the predetermined dissipated heat is provided by a combination of the rotor current and the ratio minimizing the interference signals.

20 Claims, 1 Drawing Sheet

(51) Int. Cl.
  *B60L 1/02* (2006.01)
  *B60L 15/20* (2006.01)

(56) References Cited

U.S. PATENT DOCUMENTS

2017/0174039 A1    6/2017  Schedel et al.
2019/0048990 A1*   2/2019  Lasch ................ F16H 57/0476

FOREIGN PATENT DOCUMENTS

| DE | 10 2014 211 447 | A1 | 12/2015 | | |
| DE | 10 2014 217 959 | A1 | 3/2016 | | |
| DE | 102015219870 | A1 | * 4/2017 | .............. | H02P 29/62 |
| DE | 10 2016 206 765 | A1 | 10/2017 | | |
| JP | 2-155827 | A | 6/1990 | | |
| WO | WO 2015/193172 | A1 | 12/2015 | | |

OTHER PUBLICATIONS

German-language Written Opinion (PCT/ISA/237) issued in PCT Application No. PCT/EP2018/081356 dated Feb. 12, 2019 (six (6) pages).

* cited by examiner

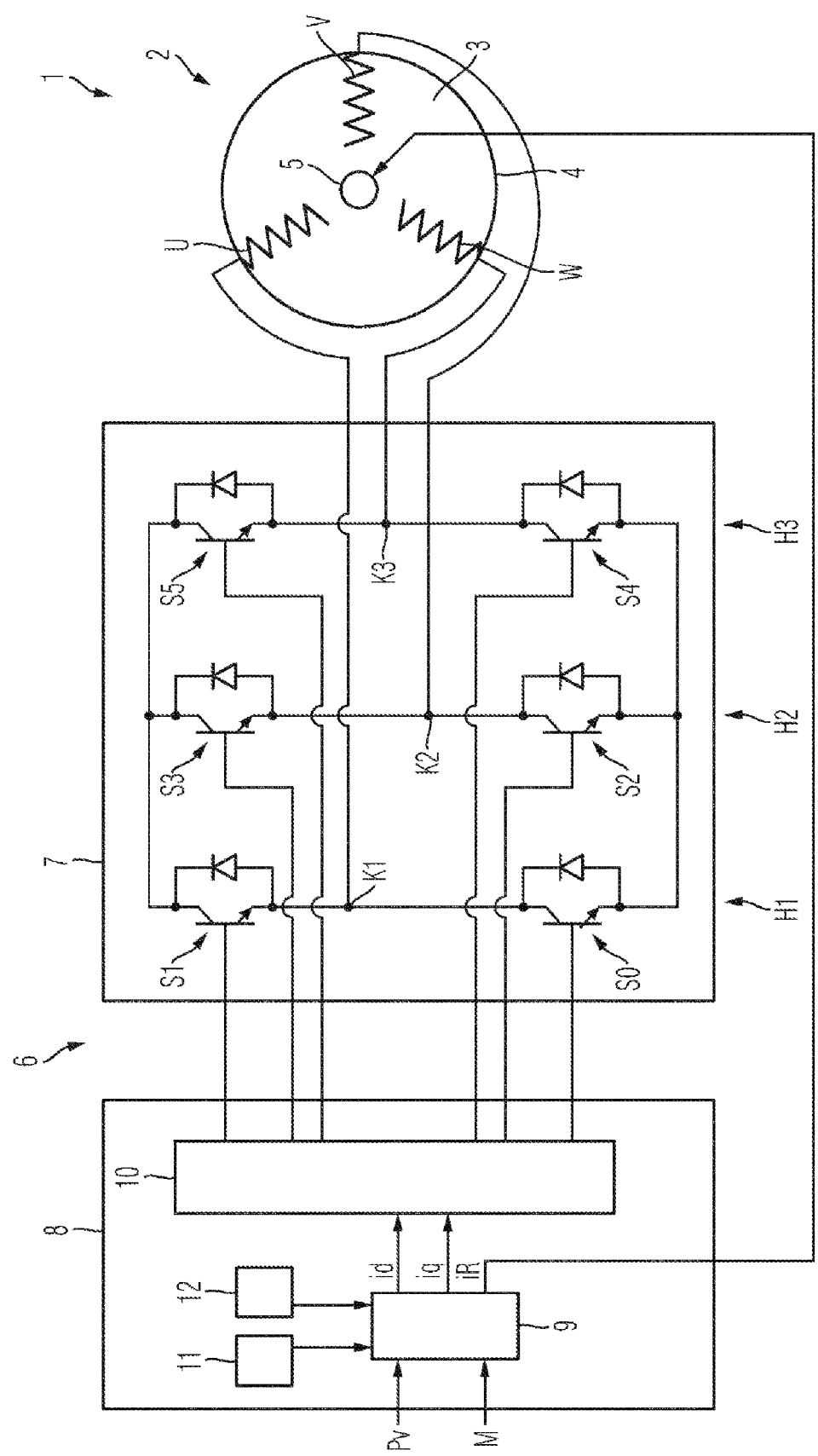

METHOD FOR CONTROLLING DISSIPATED HEAT IN AN ELECTRICAL POWER PLANT OF A MOTOR VEHICLE, ELECTRICAL POWER PLANT FOR A MOTOR VEHICLE, AND MOTOR VEHICLE

CROSS REFERENCE TO RELATED APPLICATIONS

This application is a continuation of PCT International Application No. PCT/EP2018/081356, filed Nov. 15, 2018, which claims priority under 35 U.S.C. § 119 from German Patent Application No. 10 2017 222 684.6, filed Dec. 14, 2017, the entire disclosures of which are herein expressly incorporated by reference.

BACKGROUND AND SUMMARY OF THE INVENTION

The invention relates to a method for controlling an amount of dissipated heat in an electric traction machine of a motor vehicle, wherein a current is supplied to the electric traction machine by a control device, a ratio being specified in the current of a field-forming current and a torque-forming current, which deviates from an optimum ratio for a respective operating point of the power plant, in order to provide a pre-determined amount of dissipated heat. The invention additionally relates to an electric drive unit and to a motor vehicle.

It is already known in the prior art to use dissipated heat of an electric traction machine, which functions for driving a motor vehicle designed as an electric or hybrid motor vehicle, for heating an interior of the motor vehicle. This is described, for example, in DE 10 2012 019 005 A1. It is also known from the prior art to control the amount of dissipated heat of the electric traction machine in order to deliberately increase it. WO 2015/193172 A1 describes a method for controlling the dissipated heat generated by a motor vehicle with an electric drive. A current is thereby supplied to an electric machine of the electric drive from a drive control means of the electric drive in such a way that a ratio of a field-forming current and a torque-forming current is located outside of an optimum ratio for the respective operating point. The disadvantage of magnetically excited noise may result from controlling the dissipated heat merely from the field-forming current and the torque-forming current. This noise may, for example, be perceived by vehicle passengers and regarded as annoying. Acoustics of the electric traction machine may thus be impaired by controlling the amount of dissipated heat.

It is an object of the present invention to control an amount of dissipated heat of an electric traction machine for a motor vehicle while optimizing the acoustics of the electric traction machine.

The above-described problem is solved according to the invention by a method, an electric drive unit, and a motor vehicle with the features according to the respective independent patent claims. Advantageous embodiments of the invention are the subject matter of the dependent patent claims, the description, and the FIGURE.

In a method according to the invention, dissipated heat is controlled in an electric traction machine of a motor vehicle. A current is supplied to the electric traction machine by a control device, a ratio being specified in the current of a field-forming current and a torque-forming current, which deviates from an optimum ratio of a field-forming current and a torque-forming current for a respective operating point of the power plant, in order to provide a pre-determined amount of dissipated heat. In addition, the pre-determined amount of dissipated heat is provided by a power plant designed as a magnet-less three-phase machine, in that a rotor current flowing through a rotor of the three-phase machine is additionally set by the control device. The field-forming current and the torque-forming current are thereby specified in such a way that acoustic noise signals of the three-phase machine are minimized by the ratio. The rotor current is set in such a way that the predetermined amount of dissipated heat is provided by a combination of the rotor current and the ratio that minimizes interference signals.

The invention additionally relates to an electric drive unit for a motor vehicle having an electric traction machine and a control device. The control device is designed for controlling an amount of dissipated heat of the power plant by providing a current to the power plant, a ratio being specified in the current of a field-forming current and a torque-forming current, which deviates from an optimum ratio of the field-forming current and the torque-forming current for a respective operating point of the power plant, in order to provide a pre-determined amount of dissipated heat. In addition, the electric traction machine is designed as a magnet-less three-phase machine. The control device is designed to additionally set a rotor current flowing through a rotor of the three-phase machine, and thereby to specify the field-forming current and the torque-forming current in such a way that acoustic noise signals of the three-phase machine are minimal due to the ratio, and the rotor current is set in such a way that the predetermined amount of dissipated heat is provided by a combination of the rotor current and the ratio that minimizes interference signals.

The electric traction machine functions for driving a motor vehicle designed as an electric vehicle or as a hybrid vehicle and is designed as a magnet-less three-phase machine. The three-phase machine has a stator mounted stationarily in the motor vehicle and a rotor mounted to be rotational with respect to the stator. The control device has, in particular, an inverter, by which a current may be supplied to the three-phase machine in the form of a three-phase alternating current or a three-phase current. The inverter has a number of strands or half bridges switched in parallel, corresponding to the number of phases of the three-phase machine, wherein each strand has a series circuit of switches, in particular semiconductor switches. A node between two switches is connected to a winding of the three-phase machine corresponding to one phase. The switches of the inverter may be closed by a control unit of the control device according to a predetermined pattern in such a way that a direct current, provided by a high-voltage accumulator of the electric drive unit, is converted into a three-phase current. The three-phase current is supplied to the three-phase machine, by which a rotating magnetic field or rotating field is generated in the stator, the field driving a rotation of the rotor.

To control a torque generated by the three-phase machine, thus for setting the operating point of the three-phase machine, a so-called vector control may be used. Three-phase variables related to the stator, in this case, the three-phase alternating current supplied to the three-phase machine, is converted into a two-axis coordinate system related to the rotor with axes d and q. The torque is mapped by a q value, in this case by the torque-forming current, and the magnetic flux density is mapped by a d value, in this case by the field-forming current. The torque may thereby be controlled depending on multiple combinations of the torque-forming current and the field-forming current. The torque-forming current and the field-forming current are thus degrees of freedom in the torque control. The different combinations thus respectively provide the same torque; however at a different efficiency of the three-phase machine. In general, the ratio, for example a phase angle, between the field-forming current and the torque-forming current is selected by a controller of the control unit so that a power loss of the three-phase machine is minimal for the respectively current operating point of the three-phase machine, and thus the efficiency of the three-phase machine is maximal. The ratio between the field-forming current and the torque-forming current is thus optimal. The optimal ratio is provided to a driver of the control unit, which driver subsequently controls the switches of the inverter to generate the three-phase current forming the optimal ratio.

In order to now provide the predetermined amount of dissipated heat, the three-phase machine is deliberately trimmed in order to deliberately increase the power loss. During trimming, the ratio between the field-forming current and the torque-forming current is deliberately selected or specified by the control device such that the power loss and thus the amount of dissipated heat are increased. However, it may thereby occur that, due to the currently selected ratio, by which the desired or predetermined amount of dissipated heat is provided, the acoustics of the three-phase machine are impaired. Expressed in another way, it may occur that, due to the currently selected ratio, acoustic interference signals are generated in the form of magnetically excited noise, which may be perceived, for example, as unpleasant humming. In order to at least minimize these acoustic interference signals, the rotor current of the magnet-less three-phase machine is additionally influenced or set, which represents an additional degree of freedom in the torque control.

The values of the field-forming current, the torque-forming current, and the rotor current are thereby selected in such a way that, due to their combination, the noise is minimized on the one hand and the predetermined amount of dissipated heat and the torque corresponding to the predetermined operating point are generated on the other hand. The selection of the values of the currents thus represents an optimization problem. As the rotor current of the magnet-less three-phase machine represents an additional degree of freedom in the torque control, this advantageously also forms an additional degree of freedom when providing the predetermined amount of dissipated heat. By setting the rotor current, the amount of dissipated heat may thus be provided, which is necessary, for example, for controlling the temperature of a high-voltage accumulator, which provides electrical energy for the three-phase machine, and/or for controlling the temperature of an interior of the motor vehicle. The advantage arises from this that additional heating devices may be omitted in the motor vehicle. In addition, when providing the dissipated heat through the ratio of the field-forming current and the torque-forming current, optimized with respect to noise minimization, no noise, or at least hardly any noise is generated. The advantage arises from this that the acoustics of the three-phase machine are improved.

The predetermined amount of dissipated heat may be provided by a magnet-less three-phase machine designed as an asynchronous machine, wherein a current induced in the rotor is set as the rotor current, and a slip inducing the current is specified by the control device. The magnet-less three-phase machine of the electric drive unit is designed as an asynchronous machine according to this embodiment.

The rotor or armature of the asynchronous machine may be designed, for example, as a squirrel-cage rotor. The stator windings generate a rotating field due to the supplied three-phase alternating current, wherein a rotational speed difference exists between the rotating field speed and a rotor speed, which is also designated as a slip. This rotational speed difference causes the induction of the current, thus of a magnetically active rotor current, which itself contributes to torque formation. Thus, in order to be able to set the rotor current, the control device is designed to set the slip or the rotational speed difference. The slip is thereby set in such a way that it enables, together with the interference signal minimizing ratio of the field-forming current and the torque-forming current, the discharge of the predetermined amount of dissipated heat. For example, the slip may be selected so that the induced current increases. Due to the increase of the induced current, the power loss of the rotor, and thus of the three-phase machine, also increases.

Alternatively to this, the predetermined amount of dissipated heat is provided by a magnet-less three-phase machine designed as a current-excited synchronous machine, wherein an excitation current is set as the rotor current and the excitation current is specified by the control device. The magnet-less three-phase machine of the electric drive unit is designed as a current-excited synchronous machine according to this embodiment. In the current-excited synchronous machine, the rotor likewise has a winding in which the excitation current may be supplied, for example, via slip rings. In contrast to the asynchronous machine, the rotor in the synchronous machine runs synchronously with the excitation field, wherein a flux generated by the excitation current in the rotor winding and the stator flux overlap into one resulting flux. The excitation current is thereby set by the control device in such a way that it enables, together with the interference minimizing ratio of the field-forming current and the torque-forming current, the provision of the predetermined amount of dissipated heat.

It has proven advantageous if combinations of values of the rotor current, the field-forming current, and the torque-forming current are assigned to predetermined values of a torque and of the amount of dissipated heat of the three-phase machine, wherein the corresponding combination is selected by the control device and is specified for the three-phase machine to generate the predetermined amount of dissipated heat, depending on a nominal value of the torque corresponding to the respective operating point. The assignment of the values of the torque and dissipated heat, and the combinations may be stored, for example, in a conversion table or look-up table (LUT) and/or mapped in a characteristic diagram. Each combination of current values thereby provides, for example, a specific nominal torque and a maximum amount of dissipated heat for this nominal torque. From the assignment between torques and combinations of current values, that combination of current values may be selected, at which the three-phase machine provides the nominal torque corresponding with the operating point and simultaneously the desired amount of dissipated heat for each operating point of the three-phase machine. The assignment may, for example, be predetermined for the respective three-phase machine through test measurements and/or simulations, for example, during a development of the motor vehicle prior to delivery to an end customer, and stored in a vehicle-side memory device. This predetermined assignment may then be read by the control device out of the memory device for operating the three-phase machine, for example, after delivery to the end customer.

In one refinement of the invention, the three-phase machine is operated in a first operating mode, in which the optimal ratio of field-forming current and torque-forming current is specified. To provide the predetermined amount of dissipated heat, the three-phase machine is transitioned from the first operating mode into a second operating mode, in which the interference signal minimizing ratio of field-forming current and torque-forming current, deviating from the optimal ratio, is specified. The field-forming current, the torque-forming current, and the rotor current are specified, in particular for the second operating mode, in such a way that a torque of the three-phase machine is maintained constantly in the first operating mode when transitioning into the second operating mode. The three-phase machine may be operated in the two operating modes. In the first operating mode, the three-phase machine is efficiently operated, in that a power loss of the three-phase machine is minimized. Therefore, the optimal ratio of field-forming current and torque-forming current is specified. The rotor current is also set in such a way that the power loss is minimized. An optimal combination of field-forming current, torque-forming current, and rotor current is thus provided for the three-phase machine. The first operating mode is thus an efficient operating mode of the three-phase machine.

The three-phase machine may be transitioned from the first operating mode into the second operating mode. In this second operating mode, the three-phase machine is operated inefficiently, in that a power loss is maximized while simultaneously minimizing acoustic interference signals. The second operating mode is thus an inefficient operating mode of the three-phase machine. The torque of the three-phase machine is essentially not changed during the switch between the first operating mode and the second. Expressed another way, the three-phase machine has the same torque in the second operating mode, which it already had in the first operating mode prior to the transition. Thus, vehicle passengers advantageously do not notice the switch between the different operating modes.

It may thereby be provided that first combinations and second combinations of values of the rotor current, the field-forming current, and the torque-forming current are assigned to predetermined values of the torque and the amount of dissipated heat in the three-phase machine, wherein the corresponding first combination is selected by the control device, depending on a nominal value of the torque and dissipated heat, in the first operating mode corresponding to the respective operating point, and the corresponding second combination is selected in the second operating mode corresponding to the respective operating point. The assignments between the combinations and the values of the torque and dissipated heat may again be specified as characteristic diagrams or conversion tables, and may be stored in the vehicle-side memory device. To specify a predetermined nominal torque in the efficient, first operating mode, that first combination of current values may be read out of a first assignment, by means of which combination the power loss is minimized. Upon transitioning the three-phase machine into the second, inefficient operating mode, that second combination of current values, corresponding to the nominal torque, is then read out of the second assignment, by means of which combination the power loss is maximized and acoustic interference signals are minimized.

The second operating mode is preferably provided to control the temperature of at least one component of the motor vehicle by the dissipated heat provided in the second operating mode. The three-phase machine is thus always transitioned from the first operating mode into the second operating mode if the at least one component of the motor vehicle is to have its temperature controlled, for example, heated. The at least one component may be, for example, an interior or a passenger compartment of the motor vehicle and/or the high-voltage accumulator of the electric drive unit. By controlling the temperature of the at least one component by the power loss, generated by the three-phase machine, additional heating devices may, in particular, be omitted, for example, continuous flow heaters or heating mats in the high-voltage accumulator, which lead to additional costs, additional installation space, and increased weight in the motor vehicle.

The invention additionally relates to a motor vehicle with at least one electric drive unit according to the invention or to an embodiment of the same. The motor vehicle is designed, in particular, as an electric vehicle or hybrid vehicle. The drive unit may additionally have a high-voltage accumulator, which provides electrical power for the three-phase machine. The electrical power provided by the high-voltage accumulator may be converted by the inverter of the control device into a three-phase alternating current and provided to the three-phase machine.

The embodiments and their advantages, introduced with respect to the method according to the invention, correspondingly apply for the electric drive unit according to the invention and for the motor vehicle according to the invention.

Additional features of the invention arise from the claims, the FIGURE, and the description of the FIGURE. The features and combinations of features, previously mentioned in the description, and the features and combinations of features, subsequently listed in the description of the FIGURE and/or only shown in the FIGURE, are usable, not only in the respectively indicated combination, but instead also in other combinations or individually.

The invention is now described in greater detail by way of a preferred exemplary embodiment and with reference to the drawing.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE shows a schematic depiction of one embodiment of an electric drive unit according to the invention.

DETAILED DESCRIPTION OF THE DRAWING

An electric drive unit 1 for a motor vehicle, not shown, is depicted in the FIGURE. The motor vehicle may be designed, for example, as a passenger vehicle in the form of an electric or hybrid vehicle and have electric drive unit 1 for driving the motor vehicle. Drive unit 1 has an electric traction machine 2, which is designed as a magnet-less three-phase machine 3. Three-phase machine 3 has a stator 4 mounted stationarily in the motor vehicle with stator windings U, V, W. In addition, three-phase machine 3 has a rotor 5 mounted rotatably with respect to stator 4. Three-phase machine 3 may, for example, be designed as an asynchronous machine, in which rotor 5 is designed, for example, as a squirrel-cage rotor. Three-phase machine 3 may also be designed as a current-excited synchronous machine, in which rotor 5 has a rotor winding into which an excitation current is supplied.

Electric drive unit 1 additionally has a control device 6, which is designed to control magnet-less three-phase machine 3. Control device 6 additionally has an inverter 7 and a control unit 8 with a controller 9 and a driver 10. Inverter 7 is designed to convert a direct current, provided by a high-voltage accumulator, not shown here, into a three-phase alternating current or three-phase current for three-phase machine 3. Inverter 7 has three half bridges H1, H2, H3, wherein each half bridge H1, H2, H3 is respectively electrically connected to one of windings U, V, W of stator 4. Each half bridge H1, H2, H3 has a series circuit of switching units S0, S1, S2, S3, S4, S5, which may have semiconductor switches, for example, in the form of IGBTs or power MOSFETs. A node K1, K2, K3 between two switching units S0, S1, S2, S3, S4, S5 is electrically connected to a stator winding U, V, W.

In order to supply the three-phase current to three-phase machine 3, the switching units S0 to S5 are closed by driver 10 of control unit 8 according to a predetermined pattern. The predetermined pattern is specified to driver 10 by controller 9, which is designed as a torque controller for controlling a torque M of three-phase machine 3 and thus for setting an operating point of three-phase machine 3. Torque M is thereby controlled depending on a ratio between a field-forming current id and a torque-forming current iq. The ratio may, for example, be set via a phase angle between field-forming current id and torque-forming current iq. In a first operating mode of three-phase machine 3, the ratio between field-forming current id and torque-forming current iq is selected for the specified torque M or nominal torque in such a way that an amount of dissipated heat Pv provided by three-phase machine 3 is minimal. Three-phase machine 3 is thus to be operated particularly efficiently by the first operating mode. Driver 10 is designed to set the three-phase current by controlling and closing corresponding switching units S0 to S5 in such a way that the optimal ratio of field-forming current id and torque-forming current iq arises.

Three-phase machine 3 may also be operated in a second operating mode, in which a ratio is specified between field-forming current id and torque-forming current iq, which deviates from the optimal ratio. In the second operating mode, three-phase machine 3 is thus deliberately operated or trimmed to be inefficient, in order to increase the amount of dissipated heat Pv. This dissipated heat Pv may be used, for example, to control the temperature of at least one component of the motor vehicle, for example, for heating an interior of the motor vehicle and/or the high-voltage accumulator. In order to now prevent that noise is generated by the trimming, and thus acoustic interference signals occur, the ratio between field-forming current id and torque-forming current iq is selected in such a way that the acoustic interference signals are minimized.

In order to still be able to provide the desired power loss or amount of dissipated heat Pv, a rotor current of rotor 5 of magnet-less three-phase machine 3 is additionally set. In the case that magnet-less three-phase machine 3 is designed as an asynchronous machine, a slip can be set, thus a rotational speed difference between a rotational speed of the rotating field of stator 4 and a rotational speed of rotor 5, which contributes to the torque formation. A current is namely induced in rotor 5 by the slip, so that by changing the slip, the induced current, thus the rotor current, is also changed. In the case that magnet-less three-phase machine 3 is designed as a current-excited synchronous machine, an excitation current supplied into a rotor winding of the rotor 5, which contributes to the torque formation, may be set.

For example, a first assignment 11 may be determined for controller 9, in which first combinations of values of field-forming current id, values of torque-forming current iq, and values for setting rotor current iR are assigned to different values for torque M and for dissipated heat Pv of three-phase machine 3. In addition, a second assignment 12 may be specified, in which second combinations of values of field-forming current id, values of torque-forming current iq, and values for setting excitation current iR are assigned to different values for torque M and for dissipated heat Pv of three-phase machine 3. In the case of the current-excited synchronous machine, the values for setting rotor current iR are values for the excitation current. In the case of the asynchronous machine, the values for setting the rotor current iR are values for the slip.

The first assignment 11 is then used if the first operating mode, thus the efficient operating mode, of three-phase machine 3 is to be provided. This operating mode is provided, for example, if no temperature control of the at least one component of the motor vehicle is necessary. Depending on the specified nominal torque M, the corresponding first combination of current values is selected from first assignment 11. If the second operating mode is to be provided, for example, to control the temperature of the at least one component of the motor vehicle, then the corresponding combination of current values may be selected from second assignment 12. During transition of three-phase machine 3 from the first operating mode into the second, torque M of electric three-phase machine 3 remains constant. Assignments 11, 12 may be stored, for example, in a vehicle-side memory device, not shown here, and read out by control unit 8. The combinations of the current values for assignments 11, 12 may be predetermined, for example, through test measurements and/or simulations.

LIST OF REFERENCE NUMERALS

1 Electric drive unit
2 Electric traction machine
3 Three-phase machine
4 Stator
5 Rotor
6 Control device
7 Inverter
8 Control unit
9 Controller
10 Driver
11 First assignment
12 Second assignment
U, V, W Stator windings
H1, H2, H3 Half bridges
S0, S1, S2, S3, S4, S5 Switching units
K1, K2, K3 Nodes
M Torque
id Field-forming current
iq Torque-forming current
iR Rotor current
Pv Dissipated heat The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling an amount of dissipated heat in an electric traction machine of a motor vehicle, wherein a current is supplied to the electric traction machine by a control device, a ratio being specified in the current between a field-forming current and a torque-forming current, which deviates from an optimum ratio for a respective operating point of the power plant, in order to provide a predetermined amount of dissipated heat, the method comprising:

providing the predetermined amount of dissipated heat by the electric traction machine, designed as a magnet-less three-phase machine, in that a rotor current flowing through a rotor of the three-phase machine is additionally set by the control device, wherein the field-forming current and the torque-forming current are specified in such a way that acoustic interference signals of the three-phase machine are minimized by the ratio, and the rotor current is set in such a way that the predetermined amount of dissipated heat is provided by a combination of the rotor current and the ratio that minimizes interference signals.

2. The method according to claim 1, wherein the predetermined amount of dissipated heat is provided by a magnet-less three-phase machine designed as an asynchronous machine, wherein an induced current is set in the rotor as the rotor current, and a slip inducing the current is specified by the control device.

3. The method according to claim 2, wherein combinations of values of the rotor current, the field-forming current, and the torque-forming current are assigned to predetermined values of a torque of the three-phase machine and an amount of dissipated heat of the three-phase machine, wherein the corresponding combination for generating the predetermined amount of dissipated heat, depending on a nominal value of the torque corresponding to the respective operating point, is selected by the control device and specified for the three-phase machine.

4. The method according to claim 2, wherein the three-phase machine is operated in a first operating mode, in which the optimal ratio is specified for the field-forming current and the torque-forming current, and to provide the predetermined amount of dissipated heat, the three-phase machine is transitioned from the first operating mode into a second operating mode, in which the interference signal minimizing ratio is specified of the field-forming current and the torque-forming current, deviating from the optimal ratio.

5. The method according to claim 4, wherein first combinations and second combinations of values of the rotor current, the field-forming current, and the torque-forming current are assigned to predetermined values of the torque and the amount of dissipated heat of the three-phase machine, wherein, depending on a nominal value of the torque and the amount of dissipated heat corresponding to the respective operating point, the corresponding first combination is selected in the first operating mode and the corresponding second combination is selected in the second operating mode by the control device.

6. The method according to claim 1, wherein the predetermined amount of dissipated heat is provided by a magnet-less three-phase machine designed as a current-excited synchronous machine, wherein an excitation current is set as the rotor current, and the excitation current is specified by the control device.

7. The method according to claim 6, wherein combinations of values of the rotor current, the field-forming current, and the torque-forming current are assigned to predetermined values of a torque of the three-phase machine and an amount of dissipated heat of the three-phase machine, wherein the corresponding combination for generating the predetermined amount of dissipated heat, depending on a nominal value of the torque corresponding to the respective operating point, is selected by the control device and specified for the three-phase machine.

8. The method according to claim 6, wherein the three-phase machine is operated in a first operating mode, in which the optimal ratio is specified for the field-forming current and the torque-forming current, and to provide the predetermined amount of dissipated heat, the three-phase machine is transitioned from the first operating mode into a second operating mode, in which the interference signal minimizing ratio is specified of the field-forming current and the torque-forming current, deviating from the optimal ratio.

9. The method according to claim 8, wherein first combinations and second combinations of values of the rotor current, the field-forming current, and the torque-forming current are assigned to predetermined values of the torque and the amount of dissipated heat of the three-phase machine, wherein, depending on a nominal value of the torque and the amount of dissipated heat corresponding to the respective operating point, the corresponding first combination is selected in the first operating mode and the corresponding second combination is selected in the second operating mode by the control device.

10. The method according to claim 1, wherein combinations of values of the rotor current, the field-forming current, and the torque-forming current are assigned to predetermined values of a torque of the three-phase machine and an amount of dissipated heat of the three-phase machine, wherein the corresponding combination for generating the predetermined amount of dissipated heat, depending on a nominal value of the torque corresponding to the respective operating point, is selected by the control device and specified for the three-phase machine.

11. The method according to claim 10, wherein the three-phase machine is operated in a first operating mode, in which the optimal ratio is specified for the field-forming current and the torque-forming current, and to provide the predetermined amount of dissipated heat, the three-phase machine is transitioned from the first operating mode into a second operating mode, in which the interference signal minimizing ratio is specified of the field-forming current and the torque-forming current, deviating from the optimal ratio.

12. The method according to claim 11, wherein first combinations and second combinations of values of the rotor current, the field-forming current, and the torque-forming current are assigned to predetermined values of the torque and the amount of dissipated heat of the three-phase machine, wherein, depending on a nominal value of the torque and the amount of dissipated heat corresponding to the respective operating point, the corresponding first combination is selected in the first operating mode and the corresponding second combination is selected in the second operating mode by the control device.

13. The method according to claim 1, wherein the three-phase machine is operated in a first operating mode, in which the optimal ratio is specified for the field-forming current and the torque-forming current, and to provide the predetermined amount of dissipated heat, the three-phase machine is transitioned from the first operating mode into a second operating mode, in which the interference signal minimizing ratio is specified of the field-forming current and the torque-forming current, deviating from the optimal ratio.

14. The method according to claim 13, wherein the field-forming current, the torque-forming current, and the rotor current are specified for the second operating mode in such a way that a torque of the three-phase machine in the first operating mode is maintained constantly during the transition into the second operating mode.

15. The method according to claim 14, wherein first combinations and second combinations of values of the rotor current, the field-forming current, and the torque-forming current are assigned to predetermined values of the torque and the amount of dissipated heat of the three-phase machine, wherein, depending on a nominal value of the torque and the amount of dissipated heat corresponding to the respective operating point, the corresponding first combination is selected in the first operating mode and the corresponding second combination is selected in the second operating mode by the control device.

16. The method according to claim 15, wherein the second operating mode is provided for controlling the temperature of at least one component of the motor vehicle by the amount of dissipated heat provided in the second operating mode.

17. The method according to claim 14, wherein the second operating mode is provided for controlling the temperature of at least one component of the motor vehicle by the amount of dissipated heat provided in the second operating mode.

18. The method according to claim 13, wherein the second operating mode is provided for controlling the temperature of at least one component of the motor vehicle by the amount of dissipated heat provided in the second operating mode.

19. An electric drive unit for a motor vehicle having an electric traction machine and a control device which is designed for controlling an amount of dissipated heat of the power plant, a current is provided to the electric traction machine for providing a predetermined amount of dissipated heat, a ratio being specified between a field-forming current and a torque-forming current, which deviates from an optimum ratio for a respective operating point of the power plant wherein the electric traction machine is designed as a magnet-less three-phase machine, and the control device is designed to additionally set a rotor current flowing through a rotor of the three-phase machine, and thereby to specify the field-forming current and the torque-forming current in such a way that acoustic interference signals of the three-phase machine are minimal due to the ratio, and the rotor current is set in such a way that the predetermined amount of dissipated heat is provided by a combination of the rotor current and the interference minimizing ratio.

20. A motor vehicle having at least one electric drive unit for the motor vehicle having an electric traction machine and a control device which is designed for controlling an amount of dissipated heat of the power plant, a current is provided to the electric traction machine for providing a predetermined amount of dissipated heat, a ratio being specified between a field-forming current and a torque-forming current, which deviates from an optimum ratio for a respective operating point of the power plant wherein the electric traction machine is designed as a magnet-less three-phase machine, and the control device is designed to additionally set a rotor current flowing through a rotor of the three-phase machine, and thereby to specify the field-forming current and the torque-forming current in such a way that acoustic interference signals of the three-phase machine are minimal due to the ratio, and the rotor current is set in such a way that the predetermined amount of dissipated heat is provided by a combination of the rotor current and the interference minimizing ratio.

* * * * *